Patented May 16, 1950

2,508,323

UNITED STATES PATENT OFFICE 2,508,323

TRIAZINE DERIVATIVES AND METHODS OF PREPARING THE SAME

Pierrepont Adams, Glenbrook, Conn., assignor to American Cyanamid Company, New York, N. Y., a corporation of Maine No Drawing. Application December 20, 1946, Serial No. 717,589

15 Claims. (Cl. 260—249.5)

This invention relates to new chemical compounds, more particularly triazine derivatives, and to methods of preparing the same. The invention especially is concerned with the production of chemical compounds represented by the general formula I 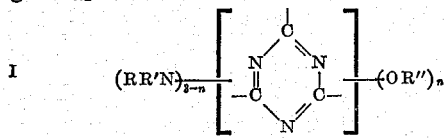

where $n$ represents an integer which is at least 1 and not more than 2, R represents a member of the class consisting of hydrogen, lower alkyl radicals and cyclohexyl radicals, R' represents a cyclohexyl radical, and R'' represents a primary aliphatic hydrocarbon radical.

Illustrative examples of lower alkyl radicals which R in the above formula may represent are: methyl, ethyl, propyl, isopropyl, butyl (n-butyl), isobutyl, sec.-butyl, tert.-butyl, amyl, isoamyl, etc. Illustrative examples of radicals which R'' in the aforesaid formula may represent are: saturated and unsaturated monovalent aliphatic hydrocarbon radicals derived from a primary aliphatic monohydric alcohol, e. g., methyl, ethyl, propyl, n-butyl, isobutyl, amyl, hexyl, heptyl, octyl, nonyl, decyl, dodecyl, tetradecyl, hexadecyl, octadecyl, allyl, methallyl, ethallyl, propallyl, 2-butenyl, 3-butenyl, 3-methyl-2-butenyl, 3-methyl-3-butenyl, 2-pentenyl, 3-pentenyl, 4-pentenyl, 2-methyl-2-pentenyl, 3-methyl-4-pentenyl, 2-hexenyl, 2-octenyl, 3-nonenyl, 2-decenyl, etc., alcohols.

Compounds embraced by Formula I include the 2 - cyclohexylamino-4,6-dialkoxy-1,3,5-triazines, which may be represented by the general formula IA 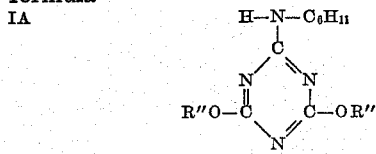

where each R'' represents an alkyl radical, specifically 2-cyclohexylamino-4,6-dimethoxy-1,3,5-triazine, the formula for which is IB 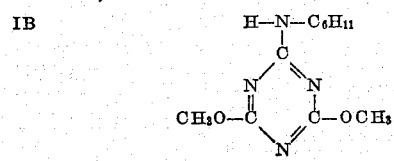

Formula I also embraces the 2-dicyclohexylamino-4,6-dialkoxy-1,3,5-triazines, which may be represented by the general formula IC 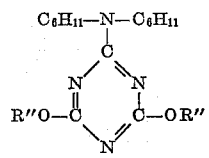

where each R'' represents an alkyl radical, specifically 2 - dicyclohexylamino - 4,6 - dimethoxy-1,3,5-triazine, the formula for which is ID 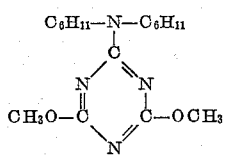

Compounds embraced by Formula I also include the 2-(N-methyl-N-cyclohexylamino)-4,6-dialkoxy-1,3,5-triazines, which may be represented by the general formula IE 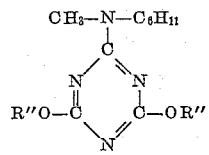

where each R'' represents an alkyl radical, specifically 2-(N-methyl-N-cyclohexylamino)-4-6-dimethoxy-1,3,5-triazine, the formula for which is IF 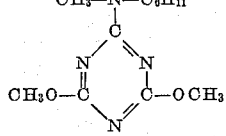

The new compounds of this invention may be used, for example, as plasticizers, insecticides, bactericides, and as intermediates in the preparation of other compounds or compositions. They are especially valuable for use in the preparation of resinous materials by reaction with a polyhydric alcohol, more particularly a dihydric alcohol, as disclosed and broadly claimed in the copending application of Frederic C. Schaefer, Serial No. 717,606, now Patent No. 2,481,156, issued September 6, 1949, and more specifically in my copending application Serial No. 717,590, now abandoned, both of which applications are being filed concurrently herewith. Compounds having a hydrogen atom attached to the nitrogen atom of the amino grouping may be reacted with an aldehyde, e. g., formaldehyde, to yield a derivative thereof. Such compounds also may be reacted with a dihydric alcohol to yield a thermoplastic linear polymer which is then reacted with an aldehyde, specifically formaldehyde, to form a thermosetting or potentially thermosetting resin as more fully disclosed and broadly claimed in the copending application of Frederic C. Schaefer, Serial No. 717,605, now Patent No. 2,481,155, issued September 6, 1949, also filed concurrently herewith. Compounds of this invention also may be used as solvents or as dispersion media, while those which contain an allyl or other polymerizable grouping may be employed alone or in combination with other polymerizable materials to yield new synthetic materials (polymers and copolymers) having particular utility in the plastics and coating arts.

Various methods may be employed to prepare the chemical compounds of my invention. I prefer to prepare them by effecting reaction under alkaline conditions and in the presence of a completely inorganic base between (1) a compound represented by the general formula

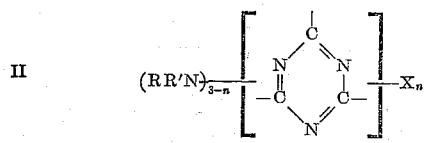

II  $(RR'N)_{3-n}\!\!-\!\!\begin{bmatrix} C \\ N\;\;N \\ \|\;\;\| \\ -C\;\;C- \\ N \end{bmatrix}\!\!-\!\!X_n$ where R and R' have the same meanings as given in Formula I and X represents a halogen selected from the class consisting of bromine and chlorine, and (2) a primary aliphatic monohydric alcohol represented by the formula R''OH where R'' is a primary aliphatic hydrocarbon radical. The alcohol is employed in an amount corresponding to at least one mol thereof for each atom represented by X in the formula for the compound of (1). The desired chemical compound embraced by Formula I is then isolated from the reaction mass.

The reaction may be carried out under a variety of temperature and pressure conditions, for instance at normal or at elevated temperatures, e. g., at the reflux temperature of the mixed reactants, and at atmospheric or superatmospheric pressure. However, atmospheric pressure and temperatures not substantially exceeding about 50° C., for instance, temperatures of the order of about 10° to 40° C. and more particularly ordinary room temperatures (20°–30° C.) are preferred. In general, the yields are somewhat higher when the reaction is effected in large part at temperatures of about 10° to 40° or 50° C. or thereabouts than when the reaction is carried out in its entirety at the reflux temperature of the mixed reactants. In order to insure complete reaction and thereby to obtain an optimum yield, the reaction mass may be heated at an elevated temperature, e. g., temperatures of the order of 70° to 80° C. or even up to the reflux temperature of the reaction mass, toward the end of the reaction period.

If desired, the reaction may be effected in the presence of an inert solvent or mixture of solvents, that is, one which will not react with the reactants in the reaction mass. Illustrative examples of solvents that may be employed are ethers (e. g., diethyl ether, dibutyl ether, etc.), ketones (e. g., acetone, diethyl ketone, methyl ethyl ketone, etc.), liquid hydrocarbons (e. g., benzene, toluene, xylene, etc.), dialkyl ethers of ethylene glycol (e. g., dimethyl ether of ethylene glycol, diethyl ether of ethylene glycol, etc.), dioxane, etc.

Various inorganic bases may be employed. I prefer to use an inorganic base that will react with the chlorine or bromine of the chloro or bromo triazine reactant to form a salt, more particularly a water-soluble salt, and which will provide alkaline conditions in the reaction mass during the entire reaction period. Illustrative examples of inorganic bases that may be employed are alkali-metal hydroxides (e. g., sodium hydroxide, potassium hydroxide, lithium hydroxide, etc.), alkali-metal carbonates (e. g., sodium carbonate, potassium carbonate, lithium carbonate, etc.), calcium hydroxide, barium hydroxide, trisodium phosphate, etc. Mixtures of inorganic bases may be used if desired.

The use of sodium hydroxide or of sodium carbonate is generally to be preferred, although the former, in some cases, may impart more color to the reaction mixture and thence into the final product. If, for example, sodium hydroxide is employed, it is preferably used in the form of a powder, and it is added to the alcohol prior to the addition of the halogenotriazine. Such inorganic bases readily dissolve in the lower alcohols, e. g., methyl alcohol, ethyl alcohol, allyl alcohol, etc., but a suspension of the base ordinarily results when it is added to the higher alcohols. However, a sufficient quantity of the base usually dissolves to maintain an alkaline condition in the reaction mass and to prevent direct reaction of the halogenotriazine with the primary aliphatic monohydric alcohol to form hydroxytriazines. Although the base, e. g., sodium hydroxide, can be added as an aqueous solution, this practice is usually not desirable because increasing quantities of hydroxytriazines are obtained when increasing amounts of water are present. Consequently, the yield of the desired ester is reduced in a direct ratio with the amount of water.

Sodium carbonate is equally or more effective than sodium hydroxide in practicing my invention, but among its disadvantages are the evolution of carbon dioxide and the larger quantity required. There is also some evidence that higher temperatures are required to complete the reaction if sodium carbonate is used than if sodium hydroxide is employed. However, higher yields of the desired compound may be generally obtained through the use of sodium carbonate and less discoloration of the product occurs.

The amount of inorganic base may be varied considerably, but to insure alkaline conditions during the entire reaction period it preferably is employed in an amount corresponding to at least 1 mol thereof for each atom of halogen (chlorine or bromine) in the halogenotriazine reactant.

The amount of primary aliphatic monohydric alcohol that is employed likewise may be varied considerably, but in all cases it is used in an amount corresponding to at least 1 mol of the alcohol for each atom of halogen (chlorine or bromine) in the halogenotriazine reactant. I prefer to use an excess of the primary alcohol over the stoichiometrical amount required, for instance, from a 5 or 10% molecular excess to 15 or 20 or more times the stoichiometrical amount necessary. It is possible to use a secondary alcohol but the reaction is slower and more side reactions occur, so that the yield is substantially lower as compared with the yield obtained when a primary alcohol is employed.

In practicing my invention, alkaline conditions should prevail in the reaction mass during the entire reaction period. These conditions are obtained when an inorganic base is used that will provide alkaline conditions during the reaction period and when the base is employed in an amount such as indicated hereinbefore. When a preferred inorganic base, hydrohalide acceptor is employed, e. g., sodium hydroxide or sodium carbonate, the halogen salt that forms during the reaction usually precipitates from the reaction mass, especially when a large excess of alcohol is used. After the salt has been filtered from the reaction mass the excess alcohol is distilled off, leaving the desired triazine derivative which may comprise, for instance, a 2-cyclohexylamino-4,6-dialkoxy-1,3,5-triazine (e. g., 2-cyclohexylamino-4,6-dimethoxy-1,3,5-triazine, 2-cyclohexylamino - 4,6 - diethoxy - 1,3,5 - triazine, etc.), a 2-dicyclohexylamino-4,6-dialkoxy-1,3,5-triazine (e. g., 2-dicyclohexylamino-4,6-dimethoxy-1,3,5-triazine, 2 - dicyclohexylamino-4,6-dipropoxy-1,3,5-triazine, etc.), a 2-(N-methyl-N-cyclohexylamino) - 4,6 - dialkoxy - 1,3,5 - triazine [e. g., 2-(N-methyl-N-cyclohexylamino)-4,6-dimethoxy - 1,3,5 - triazine, 2-(N-methyl-N-cyclohexylamino)-4,6-dibutoxy - 1,3,5 - triazine, etc.]. The crude triazine derivative thereby obtained may be purified by suitable means, e. g., by recrystallization from a solvent. If desired, the solution of the crude compound may be treated with a decolorizing carbon prior to crystallization.

Good yields of the desired compounds are obtained from the aminodihalogenotriazines and the halogenodiaminotriazines if these halogeno (chloro and bromo) intermediates are used in dry state. With particular reference to the diesters, better yields thereof, in general, are obtained when the esters of the lower alcohols are prepared. If the intermediate aminodihalogenotriazine is used in a moist state, the yields are decreased in proportion to the amount of water present. It is therefore desirable to use a dry intermediate if it can be readily prepared in this condition. However, in many cases it is more convenient and economical to prepare the aminodihalogenotriazine in an aqueous medium. This is particularly true of the N-substituted triazine derivatives, because it is usually more economical to use one mol of alkali than to use an extra mol of amine to neutralize the hydrochloric acid formed in the reaction of the cyanuric chloride with the amine. Since the wet intermediate very often cannot be dried without appreciable hydrolysis thereof, the presence of water results in lower yields of the dialkoxy or dialkenoxy triazine derivatives.

The same considerations which apply to the preparation of the diesters by the above-described method apply as well to the preparation of the monoester except for a difference in the reactivity of the intermediate halogenotriazine. The monohalogeno (monochloro and monobromo) triazine derivatives are more resistant to hydrolysis than the corresponding dihalogeno derivatives, and hence the monohalogeno intermediates are more easily made in a dry state. The lower degree of reactivity of the monohalogeno derivatives necessitates more drastic conditions for the preparation of monoesters therefrom, and the yields of these esters are generally lower than those of the corresponding diesters.

In order that those skilled in the art better may understand how the present invention may be carried into effect the following examples are given by way of illustration and not by way of limitation. All parts are by weight.

EXAMPLE 1

*Preparation of 2-cyclohexylamino-4,6-dimethoxy-1,3,5-triazine*

A hot solution of 185 parts of cyanuric chloride in about 316 parts of acetone is poured into 1000 parts of cracked ice. The temperature of the resulting slurry is $-10°$ C. To it is added 99 parts of cyclohexylamine in 10 minutes with the temperature rising to $-5°$ C. and the mass becoming neutral very quickly, after which 53 parts of sodium carbonate is added thereto. The temperature slowly increases to $+10°$ C. where it is held by means of an ice bath, and carbon dioxide is evolved over a 2-hour period. The product, 2-cyclohexylamino - 4,6 - dichloro-1,3,5-triazine, is an oil that is separated, washed with water and dried in a vacuum desiccator.

A solution of 56 parts of sodium hydroxide in about 560 parts of methanol is prepared, and to it is slowly added 173 parts of the above oil while cooling the mass to keep the temperature at 35°–40° C. The mixture is then refluxed for 30 minutes and filtered hot. On cooling, impure crystals of 2-cyclohexylamino - 4,6 - dimethoxy-1,3,5-triazine separate from the filtrate. The yield is increased by diluting the filtrate wtih water. The solid is recrystallized from hot 50% methanol and dried at 105° C. The purified 2-cyclohexylamino-4,6-dimethoxy-1,3,5 - triazine has a melting point of 127°–129° C. A small sample recrystallized from hot 50% acetone gives a melting point of 128°–129° C., which is not raised by further recrystallization, and shows the following upon analysis:

| | Percent C | Percent H | Percent N |
|---|---|---|---|
| Calculated for $C_{11}H_{18}N_4O_2$ | 55.46 | 7.56 | 23.53 |
| Found | 55.17 | 7.71 | 23.49 |
| | 55.04 | 7.51 | 23.59 |

EXAMPLE 2

*Preparation of 2-(N-methyl-N-cyclohexylamino)-4,6-dimethoxy-1,3,5-triazine*

To about 1035 parts of acetone is added 185 parts (1 mol) of cyanuric chloride, and the solution is cooled in an ice bath while adding slowly 113 parts (1 mol) of N-methyl-N-cyclohexylamine followed by 80 parts of a 50% aqueous solution of sodium hydroxide. The mixture is stirred for 30 minutes in the ice bath and then diluted with water to precipitate 2-(N-methyl-N-cyclohexylamino)-4,6-dichloro - 1,3,5 - triazine, which thereafter is separated by filtration.

A solution of 80 parts (2 mols) of sodium hydroxide in about 640 parts of methanol is prepared, and to it is added the wet 2-(N-methyl-N-cyclohexylamino)-4,6 - dichloro-1,3,5-triazine at 35°–40° C. Very little heat is evolved. The mixture is refluxed for 30 minutes, filtered hot and the filtrate diluted with water. An oil separates that is extracted with ether. The ether layer is washed with water, dried over calcium chloride and distilled. The residue comprising 2-(N-methyl - N - cyclohexylamino) - 4,6 - dimethoxy-1,3,5-triazine is an oil amounting to 215 parts (85% of the theoretical) that eventually crystallizes. Crystallization is accelerated by adding to the main portion of the oil a "seed" of crystals obtained by dissolving a small sample of the oil in ether and cooling the resulting solution in Dry Ice. Recrystallization twice from hot heptane gives a purified product melting at 60.5°–61.5° C. and showing the following upon analysis:

|  | Percent C | Precent H | Percent N |
|---|---|---|---|
| Calculated for $C_{12}H_{20}N_4O_2$ | 57.14 | 7.94 | 22.22 |
| Found | 57.31 | 7.94 | 22.29 |
|  | 57.10 | 7.97 | 22.02 |

EXAMPLE 3

*Preparation of 2-(N-ethyl-N-cyclohexylamino)-4,6-dimethoxy-1,3,5-triazine*

2-(N-ethyl-N-cyclohexylamino)-4,6-dimethoxy-1,3,5-triazine is prepared in the same manner as described under Example 2 with reference to the production of 2-(N-methyl-N-cyclohexylamino)-4,6-dimethoxy-1,3,5-triazine with the exception that 127 parts of N-ethyl-N-cyclohexylamine is used in place of 113 parts of N-methyl-N-cyclohexylamine. The product comprising 2-(N-ethyl-N-cyclohexylamino)-4,6-dimethoxy-1,3,5-triazine has a melting point below room temperature.

EXAMPLE 4

*Preparation of 2-dicyclohexylamino-4,6-dimethoxy-1,3,5-triazine*

A solution of 370 parts (2 mols) of cyanuric chloride dissolved in about 634 parts of hot acetone is poured into 1000 parts of cracked ice. To this is added slowly 362 parts (2 mols) of dicyclohexylamine, followed by 800 parts of a 10% aqueous solution of sodium hydroxide while maintaining the temperature at 5°–10° C. The mass is stirred for 1 hour at 5° C. after all of the sodium hydroxide has been added and is then filtered. The resulting wet 2-dicyclohexylamino-4,6-dichloro-1,3,5-triazine, which also may be named 2-(N,N-dicyclohexylamino)-4,6-dichloro-1,3,5-triazine, is added to a solution of 160 parts (4 mols) of sodium hydroxide dissolved in about 1270 parts of methanol. This mixture is then refluxed for 1 hour and the resulting reaction mass filtered while hot. A solid separates upon cooling the filtrate. It is filtered and dried at 105° C. The yield is 580 parts or 90% of the theoretical. This solid is extracted with hot methanol (about 150 parts fails to dissolve), and the methanol solution cooled and diluted with water. The yield of solid comprising 2-dicyclohexylamino-4,6-dimethoxy-1,3,5-triazine which separates amounts to 280 parts (44% of the theoretical) after drying at 105° C. This material is recrystallized from hot methanol and heptane to yield a purified product which melts at 108°–110° C. and shows the following upon analysis:

|  | Percent C | Percent H |
|---|---|---|
| Calculated for $C_{17}H_{28}N_4O_2$ | 63.75 | 8.75 |
| Found | 64.66 | 9.15 |
|  | 64.58 |  |

EXAMPLE 5

*Preparation of 2-cyclohexylamino-4,6-dialloxy-1,3,5-triazine*

2-cyclohexylamino-4,6-dialloxy-1,3,5-triazine is prepared in essentially the same manner as described under Example 1 with reference to the production of 2-cyclohexylamino-4,6-dimethoxy-1,3,5-triazine with the exception that about 1000 parts of allyl alcohol is used in place of 560 parts of methanol.

EXAMPLE 6

*Preparation of 2-(N-methyl-N-cyclohexylamino)-4,6-diethoxy-1,3,5-triazine*

2-(N-methyl-N-cyclohexylamino)-4,6-diethoxy-1,3,5-triazine is prepared in essentially the same manner as described under Example 2 with reference to the production of 2-(N-methyl-N-cyclohexylamino)-4,6-dimethoxy-1,3,5-triazine with the exception that 920 parts of ethyl alcohol is used in place of 640 parts of methanol.

EXAMPLE 7

*Preparation of 2-dicyclohexylamino-4,6-dimethalloxy-1,3,5-triazine*

2-dicyclohexylamino-4,6-dimethalloxy-1,3,5-triazine is prepared in essentially the same manner as described under Example 4 with reference to the production of 2-dicyclohexylamino-4,6-dimethoxy-1,3,5-triazine with the exception that 2860 parts of methallyl alcohol is used in place of 1270 parts of methanol.

EXAMPLE 8

*Preparation of 2-n-butoxy-4,6-di-(N,N'-cyclohexylamino)-1,3,5-triazine*

|  | Parts | Approx. Mol Ratio |
|---|---|---|
| 2-Chloro-4,6-di-(N,N'-cyclohexylamino)-1,3,5-triazine | 310 | 1.0 |
| n-Butanol | 810 | 10.9 |
| Sodium hydroxide (96% NaOH) | 42 | 1.0 |

The sodium hydroxide is dissolved in the butanol. The 2-chloro-4,6-di-(N,N'-cyclohexylamino)-1,3,5-triazine is added at room temperature and the mixture is heated at 100° C. for 1½ hours. The resulting reaction mass is filtered to remove the salt, after which the filtrate is distilled under reduced pressure to separate the unreacted butanol. When water is added to the residue, an oil comprising impure 2-n-butoxy-4,6-di-(N,N'-cyclohexylamino)-1,3,5-triazine is obtained. This oil solidifies upon standing at room temperature. The melting point of this solid after drying in a vacuum desiccator is not sharp, and crystallization does not materially improve the melting point. The product softens at 92° C., but is not completely melted at 150° C.

2-chloro-4,6-di-(N,N'-cyclohexylamino)-1,3,5-triazine is prepared, for example, by adding 99 parts of cyclohexylamine to 1000 parts of water. After cooling to 20° C. there is added to the aqueous solution of cyclohexylamine 185 parts of cyanuric chloride. The temperature of the mass reaches 30° C. over a period of 15 minutes, and the slurry becomes neutral. There is then added in 1 hour, while cooling to hold the temperature at 30° C., 80 parts of a 50% aqueous solution of sodium hydroxide. The slurry is neutral 30 minutes after the last of the sodium hydroxide has been added. The solid comprising impure 2-chloro-4,6-di-(N,N'-cyclohexylamino)-1,3,5-triazine is separated by filtration, washed with methanol and dried at 105° C. A yield amounting to 171 parts is obtained. This is crystallized twice from hot butanol to give a purer product melting at 228°–229° C. and showing the following upon analysis:

|  | Per cent C | Per cent H | Per cent N |
|---|---|---|---|
| Calculated for $C_{15}H_{24}N_5Cl$ | 58.16 | 7.75 | 22.62 |
| Found | 57.83 | 7.80 | 23.12 |
|  | 57.53 | 7.77 | 23.41 |

EXAMPLE 9

*Preparation of 2-cyclohexylamino-4,6-dimethoxy-1,3,5-triazine*

One hundred and sixty-eight (168) parts of sodium bicarbonate and 185 parts of cyanuric chloride are added to 500 parts of a solution containing 90% methyl alcohol and 10% water. The mixed ingredients are allowed to react at 30° to 35° C. until the evolution of carbon dioxide has diminished, after which the reaction mass is heated to reflux temperature in 15 minutes and thereafter refluxed for 25 minutes. The resulting 2-chloro-4,6-dimethoxy-1,3,5-triazine is cooled to 35° C., after which 99 parts of cyclohexylamine is added slowly while cooling the mass, followed by the addition of 84 parts of sodium bicarbonate. The resulting mixture is heated under reflux at the boiling temperature of the mass for 1 hour, cooled, diluted with water and filtered. The crude 2-cyclohexylamino-4,6-dimethoxy-1,3,5-triazine produced in this manner is mixed with 1000 parts of a 1% aqueous solution of sodium hydroxide, warmed to 70° C. and then allowed to cool slowly. The triazine derivative is separated from the aqueous alkali solution, washed with water and dried at 105° C., thereby yielding purified 2-cyclohexylamino-4,6-dimethoxy-1,3,5-triazine.

EXAMPLE 10

*Preparation of 2-dicyclohexylamino-4,6-dimethoxy-1,3,5-triazine*

2-dicyclohexylamino-4,6-dimethoxy-1,3,5-triazine is prepared in essentially the same manner as described under Example 9 with reference to the production of 2-cyclohexylamino-4,6-dimethoxy-1,3,5-triazine with the exception that in this case 181 parts of dicyclohexylamine is used in place of 99 parts of cyclohexylamine.

Examples 9 and 10 are illustrative of methods of preparing the new compounds of this invention in accordance with a reaction which may be graphically represented by the following general equation:

III

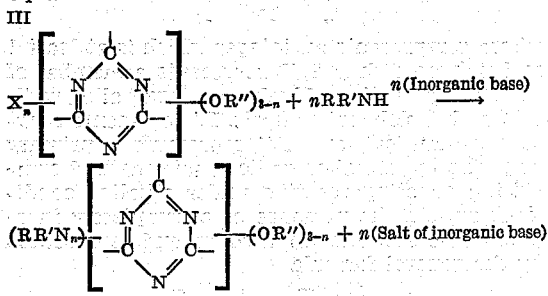

In the above equation $n$, R, R', R" and X have the same meanings as given above with reference to Formulas I and II (see Formula II for the meaning of X).

It will be understood, of course, by those skilled in the art that my invention is not limited to the specific reactants named in the above illustrative examples. Thus, instead of methyl, ethyl, allyl or methallyl alcohols, any other primary aliphatic monohydric alcohol, numerous examples of which hereinbefore have been given, may be employed.

Illustrative examples of halogenotriazines that may be used in practicing the present invention, depending upon the particular method of preparation and the particular end product desired, are:

2-cyclohexylamino-4,6-dibromo-1,3,5-triazine
2-dicyclohexylamino-4,6-dibromo-1,3,5-triazine
2-(N-propyl-N-cyclohexylamino)-4,6-dichloro-1,3,5-triazine
2-(N-isopropyl-N-cyclohexylamino)-4,6-dibromo-1,3,5-triazine
2-(N-n-butyl-N-cyclohexylamino)-4,6-dichloro-1,3,5-triazine
2-(N-isobutyl-N-cyclohexylamino)-4,6-dibromo-1,3,5-triazine
2-(N-sec.-butyl-N-cyclohexylamino)-4,6-dichloro-1,3,5-triazine
2-(N-tert.-butyl-N-cyclohexylamino)-4,6-dibromo-1,3,5-triazine
2-(N-amyl-N-cyclohexylamino)-4,6-dichloro-1,3,5-triazine
2-(N-isoamyl-N-cyclohexylamino)-4,6-dibromo-1,3,5-triazine
2-chloro-4-cyclohexylamino-6-dicyclohexylamino-1,3,5-triazine
2-bromo-4,6-di-(N,N'-cyclohexylamino)-1,3,5-triazine
2-chloro-4,6-di-(dicyclohexylamino)-1,3,5-triazine
2-bromo-4-cyclohexylamino-6-(N-methyl-N-cyclohexylamino)-1,3,5-triazine
2-chloro-4,6-di-(N-ethyl-N-cyclohexylamino)-1,3,5-triazine
2-bromo-4-(N-methyl-N-cyclohexylamino)-6-(N'-amyl-N'-cyclohexylamino)-1,3,5-triazine
2-bromo-4,6-dimethoxy-1,3,5-triazine
2-methoxy-4,6-dichloro-1,3,5-triazine
2-ethoxy-4,6-dibromo-1,3,5-triazine
2-bromo-4,6-dialloxy-1,3,5-triazine Additional examples of halogenoalkoxy and alkenoxy triazines that may be used in preparing the chemical compounds of the present invention are disclosed in the copending application of Dagfrid Holm-Hansen, Serial No. 717,593, filed concurrently herewith. Halogeno (chloro or bromo) di-(substituted amino) triazine derivatives wherein the substituted amino groupings are different are prepared, for example, by reacting cyanuric chloride or bromide with one mol equivalent of one substituted amine, isolating the resulting dihalogeno derivative and reacting it with one mol equivalent of a different substituted amine.

Illustrative examples of chemical compounds embraced by Formula I that may be produced in accordance with the present invention are:

2-cyclohexylamino-4,6-dipropoxy-1,3,5-triazine
2-methoxy-4,6-di-(N,N'-cyclohexylamino)-1,3,5-triazine
2-alloxy-4,6-di-(N,N'-cyclohexylamino)-1,3,5-triazine
2-(N-methyl-N-cyclohexylamino)-4,6-dipropoxy-1,3,5-triazine
2-dicyclohexylamino-4,6-dialloxy-1,3,5-triazine
2-(N-amyl-N-cyclohexylamino)-4,6-dibutoxy-1,3,5-triazine
2-pentoxy-4,6-di-(N,N'-cyclohexylamino)-1,3,5-triazine
2-methalloxy-4-cyclohexylamino-6-(N-methyl-N-cyclohexylamino)-1,3,5-triazine
2-hexoxy-4,6-di-(N-butyl-N-cyclohexylamino)-1,3,5-triazine 2-methoxy - 4 - cyclohexylamino - 6 - (N-ethyl-N-cyclohexylamino) -1,3,5-triazine
2-cyclohexylamino - 4,6-di-(2'-butenoxy) -1,3,5-triazine
2-dicyclohexylamino-4,6-dipentoxy-1,3,5-triazine
2-cyclohexylamino - 4 - methoxy-6-ethoxy-1,3,5-triazine
2-(N - propyl - N - cyclohexylamino) -4-alloxy-6-methalloxy-1,3,5-triazine
2-(N - ethyl - N - cyclohexylamino) - 4,6 - di - (2'-pentenoxy) -1,3,5-triazine
2-tetradecoxy - 4,6-di-(dicyclohexylamino) -1,3,5-triazine
2-dicyclohexylamino - 4-butoxy-6-pentoxy-1,3,5-triazine
2-octadecoxy - 4,6 - di-(N,N'-cyclohexylamino) -1,3,5-triazine
2-(3' - methyl - 3'-butenoxy) -4,6-di-(N-methyl-N-cyclohexylamino) -1,3,5-triazine
2-octoxy - 4 - (N-methyl-N-cyclohexylamino) -6-(N'-ethyl-N'-cyclohexylamino) -1,3,5-triazine
2-isopropoxy - 4,6 - di-(N,N'-cyclohexylamino) -1,3,5-triazine
2-cyclohexylamino - 4 - methoxy - 6-alloxy-1,3,5-triazine
2-dodecoxy - 4,6 - di-(dicyclohexylamino) -1,3,5-triazine
2-(2'-hexenoxy) - 4,6 - di - (N-isopropyl-N-cyclohexylamino) -1,3,5-triazine
2-(N - sec.-butyl-N-cyclohexylamino) -4,6-di-(2'-decenoxy) -1,3,5-triazine
2-(N - tert. - butyl - N-cyclohexylamino) -4,6-di-octoxy-1,3,5-triazine Those of the above compounds wherein the ester groupings are different are prepared, for instance, by converting an alkylamino dichloro or dibromo triazine to the corresponding monochloro or monobromo monoester of the triazine by reaction with an alcohol in the presence of one equivalent of a base. The resulting compound is isolated and then similarly caused to react with a different alcohol in the presence of a base.

Other examples will be apparent to those skilled in the art from the foregoing examples of halogenotriazine reactants and from the first and second paragraphs of this specification.

I claim:
1. Chemical compounds represented by the general formula:

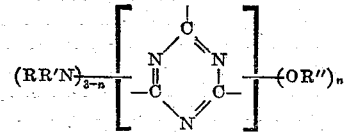

where $n$ represents an integer which is at least 1 and not more than 2, R represents a member of the class consisting of hydrogen, lower alkyl radicals and cyclohexyl radicals, R' represents a cyclohexyl radical and R'' represents a primary aliphatic hydrocarbon radical.

2. Chemical compounds as in claim 1 wherein R represents hydrogen.
3. Chemical compounds as in claim 1 wherein R represents hydrogen, $n$ is 2 and R'' represents a primary aliphatic hydrocarbon radical.
4. A 2-cyclohexylamino-4,6-dialkoxy-1,3,5-triazine represented by the general formula

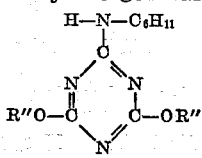

where each R'' represents an alkyl radical.

5. 2-cyclohexylamino-4,6-dimethoxy-1,3,5-triazine, the formula for which is

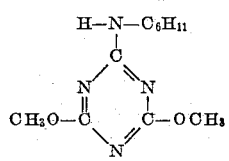

6. A 2 - dicyclohexylamino-4,6-dialkoxy-1,3,5-triazine represented by the general formula

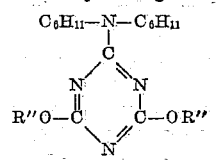

where each R'' represents an alkyl radical.

7. 2 - dicyclohexylamino-4,6-dimethoxy-1,3,5-triazine, the formula for which is

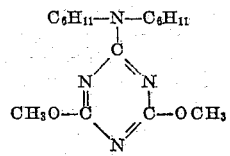

8. A 2-(N-methyl-N-cyclohexylamino)-4,6-dialkoxy-1,3,5-triazine represented by the general formula

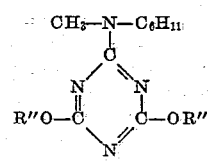

where each R'' represents an alkyl radical.

9. 2-(N - methyl - N-cyclohexylamino)-4,6-dimethoxy-1,3,5-triazine, the formula for which is

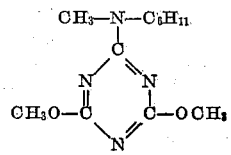

10. The method of preparing a chemical compound represented by the general formula

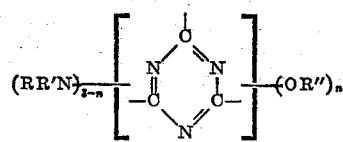

where $n$ represents an integer which is at least 1 and not more than 2, R represents a member of the class consisting of hydrogen, lower alkyl radicals and cyclohexyl radicals, R' represents a cyclohexyl radical, and R'' represents a primary aliphatic hydrocarbon radical, said method comprising effecting reaction under alkaline conditions and in the presence of a completely inorganic base between (1) a compound represented by the general formula

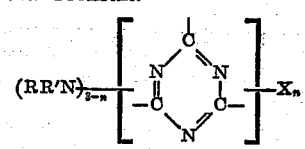

where R and R' have the meanings above given and X represents a halogen selected from the class consisting of chlorine and bromine, and (2) a primary aliphatic monohydric alcohol represented by the formula R"OH where R" has the meaning above given, said alcohol being employed in an amount corresponding to at least one mol thereof for each atom represented by X in the formula for the compound of (1), and isolating the chemical compound represented by the first-given formula from the resulting reaction mass.

11. A method as in claim 10 wherein X in the formula of the compound of (1) represents chlorine.

12. A method as in claim 10 wherein the inorganic base is sodium hydroxide.

13. A method as in claim 10 wherein the inorganic base is sodium carbonate.

14. The method of preparing a chemical compound represented by the general formula

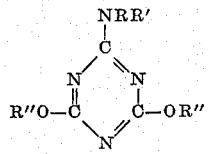

where R represents a member of the class consisting of hydrogen, lower alkyl radicals and cyclohexyl radicals, R' represents a cyclohexyl radical, and R" represents a primary aliphatic hydrocarbon radical, said method comprising effecting reaction under alkaline conditions and in the presence of an alkali-metal hydroxide between (1) a compound represented by the general formula

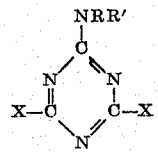

where R and R' have the meanings above given and X represents a halogen selected from the class consisting of chlorine and bromine, and (2) a primary aliphatic monohydric alcohol, said alcohol and said alkali-metal hydroxide each being employed in an amount corresponding to at least two mols thereof per mol of the compound of (1), and isolating the chemical compound represented by the first-given formula from the resulting reaction mass.

15. The method of preparing 2-dicyclohexyl-amino-4,6-dimethoxy-1,3,5-triazine which comprises effecting reaction under alkaline conditions and in the presence of sodium hydroxide between 2-dicyclohexylamino - 4,6-dichloro-1,3,5-triazine and methyl alcohol, said alcohol and sodium hydroxide each being employed in an amount corresponding to at least two mols thereof per mol of the said 2-dicyclohexylamino-4,6-dichloro-1,3,5-triazine, and said reaction being effected at atmospheric pressure and at a temperature ranging from about 10° C. to the reflux temperature of the reaction mass, the reaction being caused to take place in large part at temperatures within the range of about 10° C. to 50° C. and the higher temperatures up to the reflux temperature being employed toward the end of the reaction period, and isolating and purifying the resulting 2-dicyclohexylamino - 4,6 - dimethoxy - 1,3,5-triazine.

PIERREPONT ADAMS.

REFERENCES CITED

The following references are of record in the file of this patent:

UNITED STATES PATENTS

| Number | Name | Date |
|---|---|---|
| 2,328,961 | D'Alelio | Sept. 7, 1943 |
| 2,394,042 | D'Alelio | Feb. 5, 1946 |
| 2,394,306 | Heintrich | Feb. 5, 1946 |

OTHER REFERENCES

Controulis, J. Amer. Chem. Soc., vol. 67, pp. 1946-1948, Nov. 1945.